US006223051B1

United States Patent
Rikihisa

(10) Patent No.: US 6,223,051 B1
(45) Date of Patent: Apr. 24, 2001

(54) REDIALING APPARATUS FOR PORTABLE TELEPHONE

(75) Inventor: Hitoshi Rikihisa, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/160,098

(22) Filed: Sep. 25, 1998

(30) Foreign Application Priority Data

Sep. 25, 1997 (JP) .................................................. 9-260220

(51) Int. Cl.[7] .................................................. H04Q 7/20
(52) U.S. Cl. .......................... 455/550; 455/422; 455/424; 455/460; 455/461; 455/564; 379/58; 379/59
(58) Field of Search .................................. 455/422, 450, 455/452, 455, 462, 464, 509, 510, 433, 435, 460, 461

(56) References Cited

U.S. PATENT DOCUMENTS

| 4,829,554 | * | 5/1989 | Barnes et al. ........................ 455/432 |
| 5,239,571 | | 8/1993 | Takahashi ............................ 379/58 |
| 5,268,959 | * | 12/1993 | Hong .................................... 379/356 |
| 5,363,429 | * | 11/1994 | Fujisawa .............................. 455/415 |
| 5,544,224 | * | 8/1996 | Jonsson et al. ...................... 455/434 |
| 5,881,139 | * | 9/1999 | Romines .............................. 379/130 |
| 5,890,077 | * | 3/1999 | Hanawa et al. ..................... 455/571 |
| 6,049,723 | * | 4/2000 | Park .................................... 455/564 |

FOREIGN PATENT DOCUMENTS

| 0 526 240 | 2/1993 | (EP) . |
| 2 327 017 | 1/1999 | (GB) . |
| 2327017 | * | 1/1999 | (GB) ........................................ 7/32 |
| 64-41545 | 2/1989 | (JP) . |
| 7-58816 | 3/1995 | (JP) . |
| 7-87176 | 3/1995 | (JP) . |

* cited by examiner

Primary Examiner—Daniel Hunter
Assistant Examiner—Yemane Woldetatios
(74) Attorney, Agent, or Firm—Sughrue, Mion, Zinn, Macpeak & Seas, PLLC

(57) ABSTRACT

A redialing apparatus for a portable telephone includes a channel disconnection detection section, an on-hook processing section, a call determination section, and a redial processing section. The channel disconnection detection section monitors a communication state during communication to detect a channel disconnection. When the channel disconnection detection section detects a channel disconnection, the on-hook processing section executes on-hook processing. When the channel disconnection detection section detects the channel disconnection, the call determination section determines whether a call during communication is an outgoing call or an incoming call. When the call determination section determines that the call is an outgoing call, the redial processing section executes redial processing on the basis of calling information used for calling processing of the call during communication. When the call determination section determines that the call is an incoming call, the redial processing section executes redial processing on the basis of call reception information used for call reception processing of the call during communication.

5 Claims, 4 Drawing Sheets

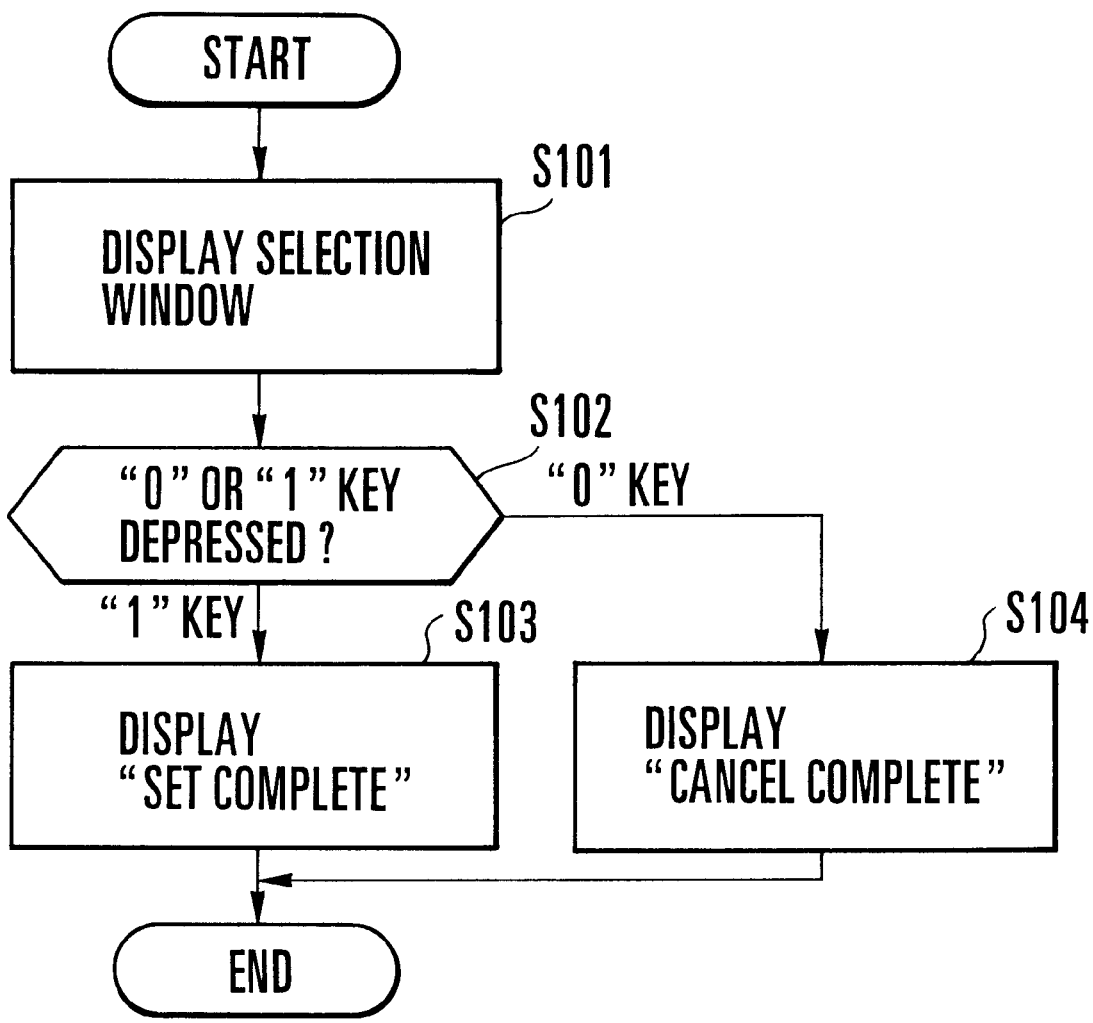
F I G. 2

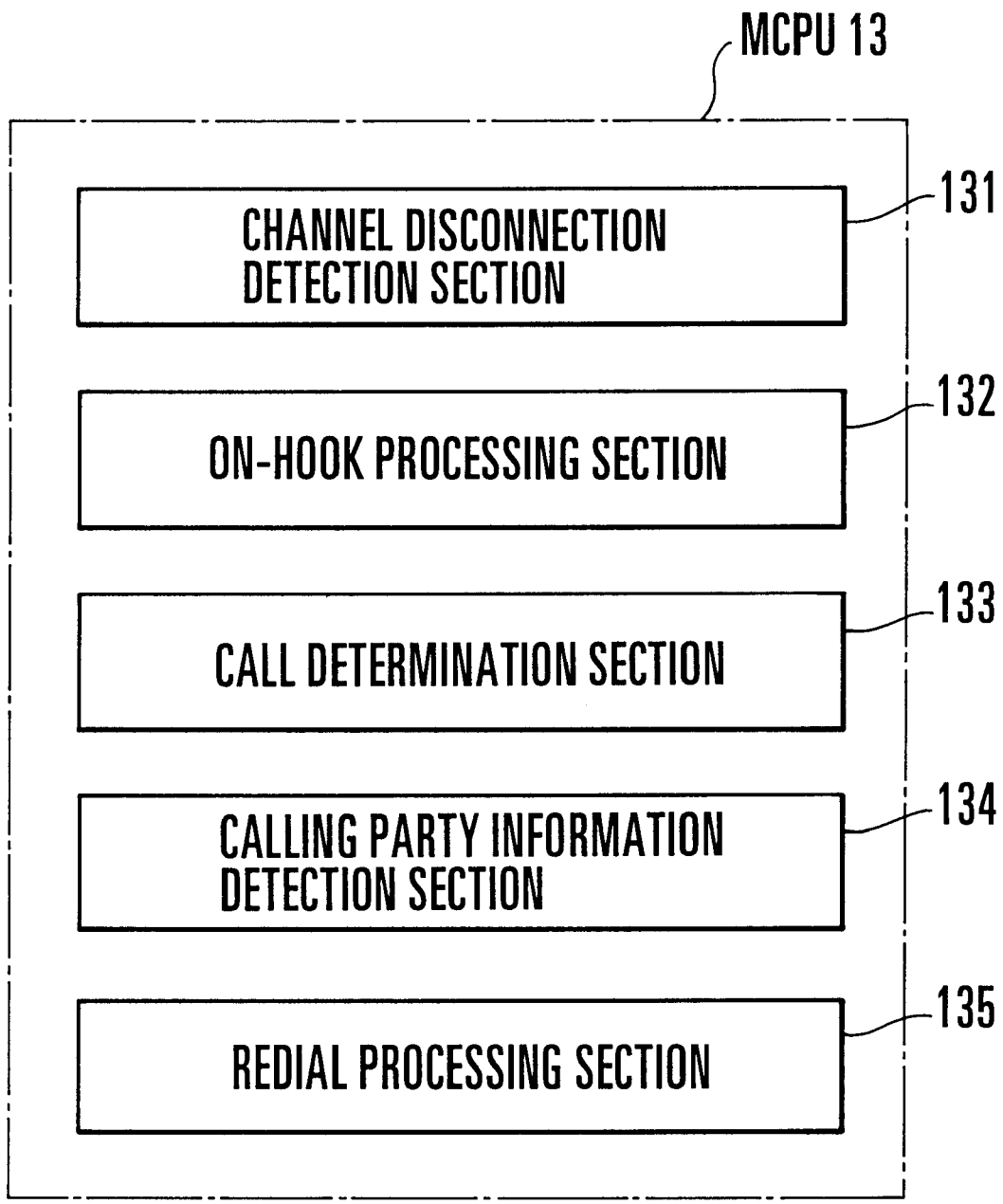
F I G. 4

REDIALING APPARATUS FOR PORTABLE TELEPHONE

BACKGROUND OF THE INVENTION

The present invention relates to a redialing system for a portable terminal device and, more particularly, to reconnection processing when a channel break (disconnection) occurs due to a radio wave fault during speech communication using a digital channel.

In a portable telephone which is popularly used as a personal communication means and can communicate at an arbitrary location, the received signal intensity largely changes because the distance from the base station changes. In addition, a radio wave attenuates due to the influence of geographical features or buildings to cause multiple propagation and then fading. For this reason, the electric field varies depending on the location. The electric field changes over time in communication during movement. Hence, the channel is assumed to be disconnected.

If speech communication suddenly breaks due to a radio wave fault, and the communication channel is disconnected, a series of cumbersome operations are required: on-hook processing is performed, and then off-hook processing is performed to redial the telephone number of the communication partner. It is preferable to automatically perform redialing to call the partner to continue the communication without requiring the above operations.

As a communication terminal device having such a redialing technique is proposed in Japanese Patent Laid-Open No. 7-87176 (reference 1). According to the communication terminal device of reference 1, a keyboard is operated in calling to read out, from a memory, a telephone number registered in advance and display it on a display device. Calling is performed using the displayed telephone number, and the communication channel is monitored during speech communication with the partner. When a communication channel disconnection is detected, a timer is started to count the communication channel disconnection time. When a predetermined time has been counted, on-hook processing is executed. After this, the telephone number of the communication partner (called party) immediately before the channel disconnection is read out from the memory again and displayed on the display device. Redial processing is executed using the displayed telephone number.

Another telephone device having a redialing technique is proposed in Japanese Patent Laid-Open No. 1-41545 (reference 2). A push-phone and digital telephone for performing a redial operation are disclosed in reference 2. According to the former push-phone, when the called party wants to temporarily disconnect speech communication due to some reason, the called party depresses a registration button and then inputs the telephone number informed from the communication partner (calling party). The input telephone number is written in a dial storage memory and simultaneously displayed on a display device. The registration button is depressed again to complete registration. After this, off-hook processing is performed, and a read button is depressed to redial the telephone number of the communication partner (calling party) immediately before.

According to the latter digital telephone, when a data packet frame having a header field, a data field, and an error check field is received from a digital channel, a calling party address contained in the header field is detected and displayed on a display device. A registration button is depressed during speech communication to write the calling party address displayed on the display device in an address memory. After on-hook, a read button is depressed to read out the calling party address stored in the calling party address memory during speech communication immediately before.

The above-described communication terminal device of reference 1 performs redial processing on the basis of the telephone number read out from the memory in correspondence with the call during speech communication. For this reason, when a channel disconnection occurs during speech communication with a partner whose telephone number is not registered in the memory in advance, redialing cannot be performed.

In addition, since timer processing, telephone number re-read processing, and processing of redisplaying the read-out telephone number are required, the redial processing program becomes complex, and the load on the control section comprising a CPU (Central Processing Unit) increases. Furthermore, redial processing corresponding to a channel disconnection during speech communication is possible only for an outgoing call and cannot be performed for an incoming call.

In the analog telephone of reference 2, redial processing is performed on the basis of the telephone number informed from the communication partner (calling party) and stored in the memory. For this reason, this telephone cannot cope with a sudden channel disconnection due to a radio wave fault during speech communication. In addition, the registration button must be operated twice, and the operation of inputting the telephone number of the communication partner, the off-hook operation of redialing the stored telephone number of the communication partner, and the read button operation are required, resulting in cumbersome operations.

The digital telephone of reference 2 performs redial processing on the basis of the calling party address detected from the header field of the received data packet frame and stored and therefore cannot cope with a sudden channel disconnection due to a radio wave fault during speech communication. Although the number of operations by the called party decreases as compared to that of the analog telephone, the registration button operation of storing the calling party address during speech communication is still required.

SUMMARY OF THE INVENTION

It is an object of the present invention to provide a redialing apparatus for a portable telephone, capable of automatically performing reconnection processing for channel disconnection without requiring any operations by a calling party or a called party.

In order to achieve the above object, according to the present invention, there is provided a redialing apparatus for a portable telephone, comprising channel disconnection detection means for monitoring a communication state during communication to detect a channel disconnection, on-hook processing means for, when the channel disconnection detection means detects a channel disconnection, executing on-hook processing, call determination means for, when the channel disconnection detection means detects the channel disconnection, determining whether a call during communication is an outgoing call or an incoming call, and redial processing means for, when the call determination means determines that the call is an outgoing call, executing redial processing on the basis of calling information used for calling processing of the call during communication, and when the call determination means determines that the call is an incoming call, executing redial processing on the basis of call reception information used for call reception processing of the call during communication.

BRIEF DESCRIPTION OF THE DRAWINGS

FIG. 2 is a flow chart showing a redial setting operation of the portable telephone shown in FIG. 1;

FIG. 4 is a functional block diagram of an MCPU shown in FIG. 1.

DESCRIPTION OF THE PREFERRED EMBODIMENT

The present invention will be described below in detail with reference to the accompanying drawings.

Figure 1:
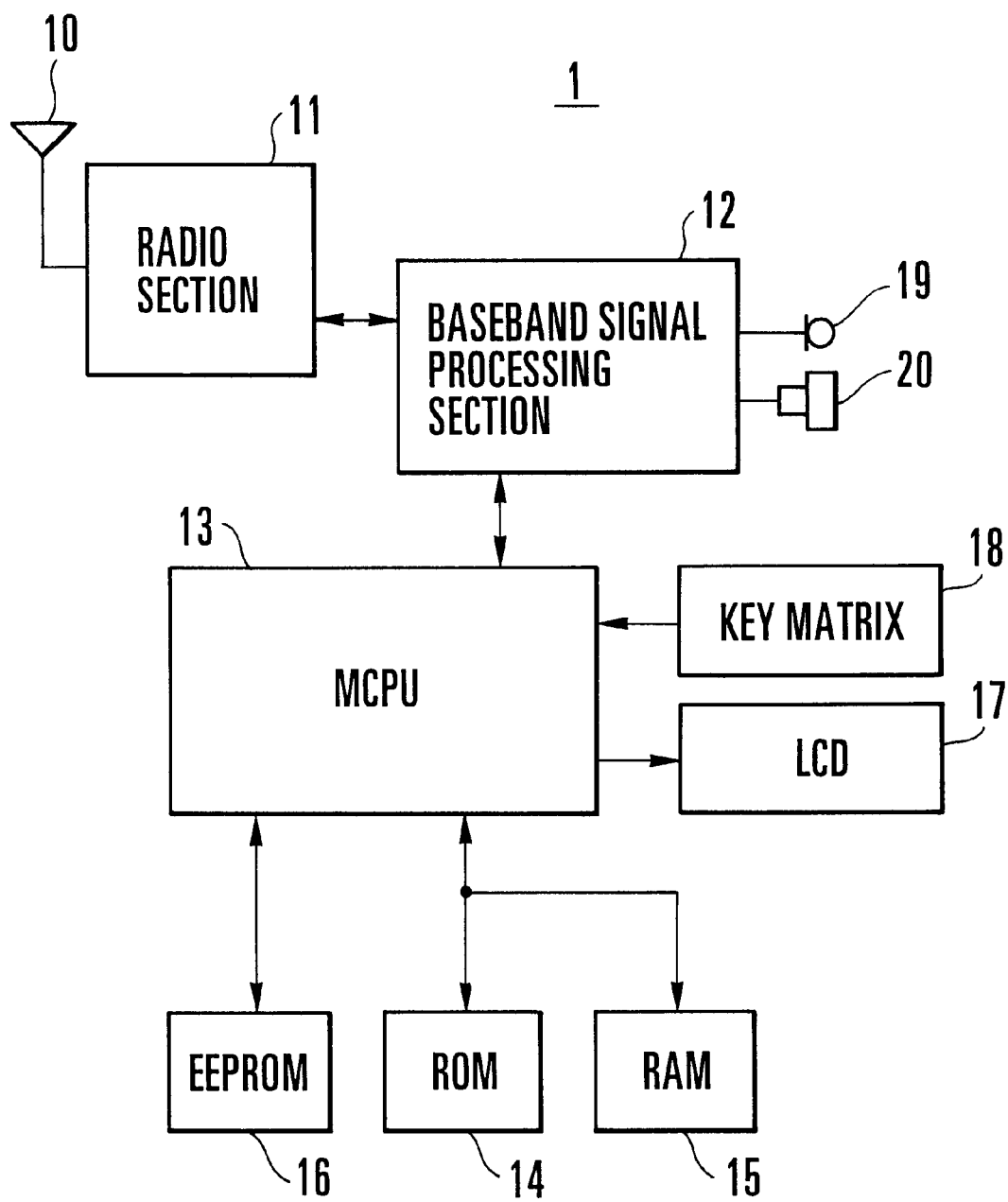
FIG. 1 is a block diagram showing the schematic arrangement of a portable telephone according to an embodiment of the present invention.

FIG. 1 shows the schematic arrangement of a portable telephone of the present invention. Referring to FIG. 1, a portable telephone 1 comprises an antenna 10, a radio section 11 connected to the antenna 10, a baseband signal processing section 12 connected to the radio section 11, a main CPU (MCPU) 13 connected to the baseband signal processing section 12, a ROM (Read Only Memory) 14 connected to the MCPU 13 and storing a control program, a RAM (Random Access memory) 15 connected to the MCPU 13 to store data, an EEPROM (Electrically Erasable and Programmable Memory) 16 connected to the MCPU 13, an LCD 17 and a key matrix 18 which are connected to the MCPU 13, and a microphone 19 and a loudspeaker 20 which are connected to the baseband signal processing section 12.

The radio section 11 amplifies a radio frequency signal received from a base station (not shown) via the antenna 10 and demodulates the signal to a digital signal. The radio section 11 also modulates a digital signal with a high-frequency signal to a radio frequency signal, amplifies the radio frequency signal, and transmits it to the base station via the antenna 10.

The baseband signal processing section 12 decodes the digital signal demodulated by the radio section 11 to convert the digital signal into an audio signal and outputs the audio signal to the loudspeaker 20. The baseband signal processing section 12 also codes an audio signal from the microphone 19 to a digital signal and sends the digital signal to the radio section 11.

The MCPU 13 controls the entire portable telephone using the control program stored in the ROM 14 and data stored in the RAM 15. The EEPROM 16 stores calling party information and called party information in calling processing and call reception processing, respectively.

FIG. 4 shows the MCPU 13. In FIG. 4, the MCPU 13 comprises a channel disconnection detection section 131 for monitoring the communication state to detect a channel disconnection, an on-hook processing section 132 for executing on-hook processing when the channel disconnection detection section 131 detects a channel disconnection, a call determination section 133 for determining whether a call during communication is an outgoing call or an incoming call when the channel disconnection detection section 131 detects a channel disconnection, a calling party information detection section 134 for searching the call reception information registration area in the calling/call reception information memory 16 to detect the presence/absence of registration of calling party information, and a redial processing section 135 for executing redial processing for an outgoing call or an incoming call and operator calling processing on the basis of the determination result from the call determination section 133 and the detection result from the calling party information detection section 134.

Redial setting processing of the portable telephone 1 having the above arrangement will be described next with reference to FIG. 2.

The key matrix 18 is operated in accordance with a predetermined procedure to select a redial setting mode. Upon detecting the ON state of the key matrix 18 and recognizing the redial setting request, the MCPU 13 reads out a corresponding message from the EEPROM 16 and displays a redial setting window on the LCD 17 (step S101).

For example, "set/cancel" is displayed in the redial setting window on the LCD 17. To register redial setting processing, the key matrix 18 is operated to select "set". To cancel setting, "cancel" is selected (step S102).

Upon detecting the ON state of the key matrix and recognizing selection of "set" ("1" key operation", the MCPU 13 reads out a "set complete" message from the EEPROM 16 and displays it on the LCD 17 (step S103). Upon recognizing selection of "cancel" ("0" key operation), the MCPU 13 reads out a "cancel complete" message from the EEPROM 16 and displays it on the LCD 17 (step S104), thus completing redial setting processing.

Figure 3:
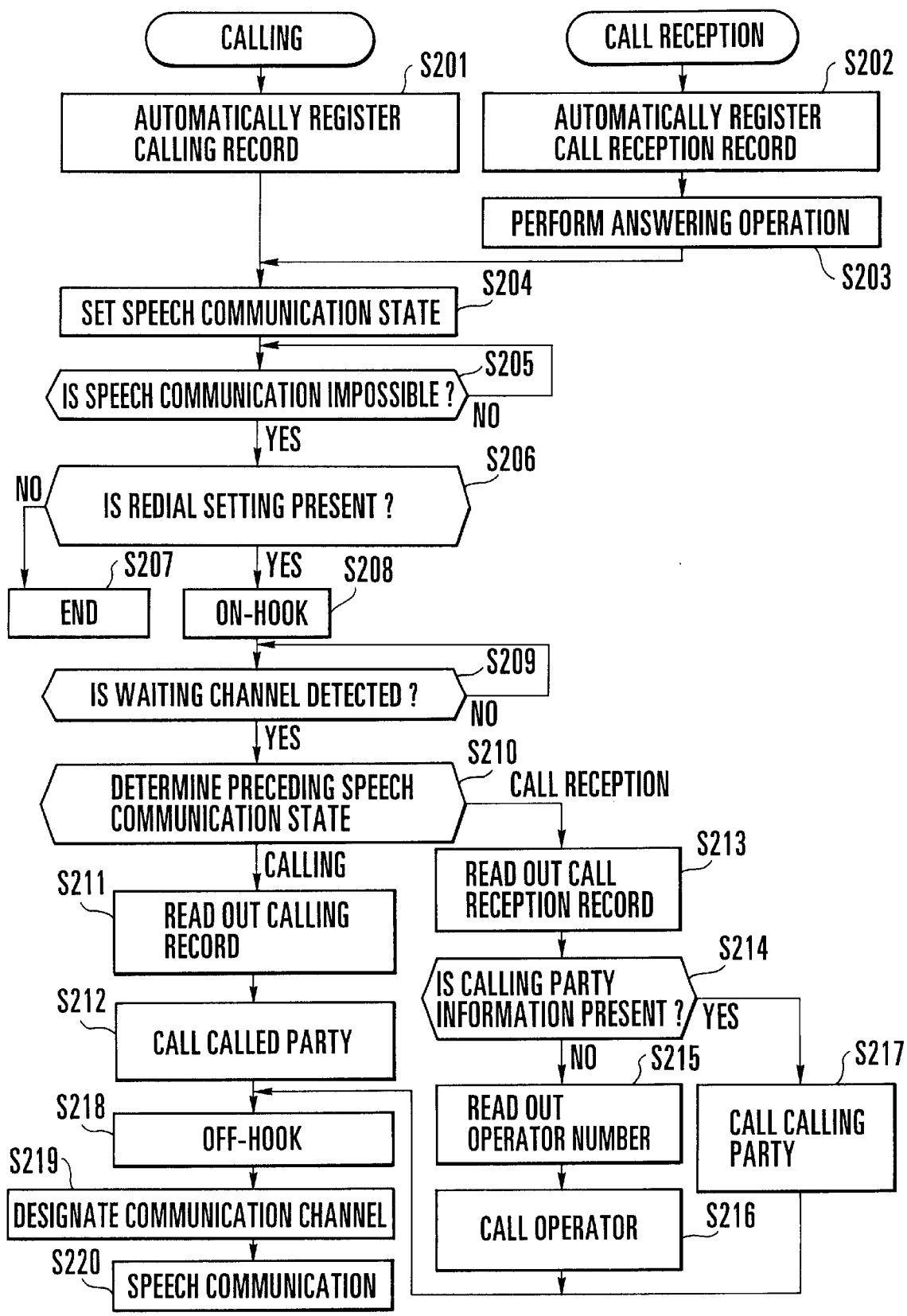
FIG. 3 is a flow chart showing a redialing operation of the portable telephone shown in FIG. 1.

Redial processing of the portable telephone 1 shown in FIG. 1 will be described next with reference to FIG. 3.

When a calling operation is performed using the key matrix 18, the MCPU 13 generates a header field containing the called party address and the calling party address and sends it to the baseband signal processing section 12. Simultaneously, the MCPU 13 stores, as a calling record, the set of the called party address and the calling party address in the calling information registration area in the EEPROM 16 (step S201).

The baseband signal processing section 12 forms a packet of the header field received from the MCPU 13 and audio data obtained by converting the audio signal input from the microphone 19 into a digital signal and sends the packet to the radio section 11. The called party is connected through the base station by a known method, so the communication state is set (step S204).

When an incoming call from the base station is received, the radio section 11 amplifies the radio frequency signal received from the base station via the antenna 10, demodulates the radio frequency signal into a digital signal, and sends the digital signal to the baseband signal processing section 12.

The baseband signal processing section 12 divides the signal from the radio section 11 into a header field and audio data. The audio data is decoded and converted into an audio signal. The audio signal is sent to the loudspeaker 20 while the header field is sent to the MCPU 13.

The MCPU 13 detects the calling party address and the called party address in the header field from the baseband signal processing section 12 and stores, as a call reception record, the set of the detected calling party address and called party address in the call reception information registration area in the EEPROM 16 (step S202). When an answering operation is performed using the key matrix 18 (step S203), this operation is detected to set the speech communication state (step S204).

When the channel disconnection detection section 131 monitors the speech communication state and detects a speech communication disable state due to, e.g., a radio channel disconnection, a reception failure, a radio wave break, a resynchronization failure, or degradation in quality (step S205), the MCPU 13 searches the EEPROM 16 to detect the presence/absence of redial setting (step S206).

If NO in step S206, the call is disconnected to end communication (step S207). If YES in step S207, a busy tone is sent to notify the user of the channel disconnection. After this, the on-hook processing section 132 performs on-hook processing to set a wait state (step S208). At this time, the base station executes channel disconnection processing to be idle.

The MCPU 13 continuously monitors the channel. Upon detecting the waiting channel (step S209), the call determination section 133 searches the calling information registration area and the call reception information registration section of the EEPROM 16 to determine whether the call before disconnection has been an outgoing call or an incoming call (step S210).

If it is determined that the call has been an outgoing call, the redial processing section 135 reads out the called party address (called party telephone number) from the calling information registration area of the EEPROM 16 (step S211) and performs redial processing on the basis of the called party address (step S212).

If it is determined that the call has been an incoming call, the calling party information detection section 134 reads out the call reception record from the call reception information registration area of the EEPROM 16 (step S213) to determine whether the calling party address (calling party telephone number) is registered (step S214).

If YES in step S214, the redial processing section 135 reads out the registered calling party address and executes redial processing (step S217).

If NO in step S214, the redial processing section 135 reads out the operator number of the base station, which is set in advance, from the EEPROM 16 (step S215) and calls the readout operator number (step S216). With this processing, the operator at the base station connects the called party to the calling party immediately before channel disconnection by a predetermined method.

In step S212, S216, or S217, when calling processing is executed and then off-hook processing is performed (step S218), the MCPU 13 designates a communication channel (step S219) and waits for answering from the called party. When the called party answers the call, the channel is reconnected to restore communication with the calling party or called party immediately before (step S220).

As has been described above, according to the present invention, when the call before the channel disconnection is an outgoing call, redial processing is executed on the basis of called party information in the calling record. If the call is an incoming call, redial processing is executed on the basis of the calling party information in the call reception record. If no calling party information is registered in the call reception record, the base station is called on the basis of the operator number of the base station, which is set in advance, to request the operator to connect the calling party. With this arrangement, any communication partner can be redialed. When a channel disconnection occurs during speech communication, redial processing can be performed to restore communication with any communication partner.

Since timer processing, telephone number re-read processing, and processing of redisplaying the readout telephone number can be omitted, the redial processing program can be simplified, and the load on the MCPU can be reduced.

In addition, redial processing in channel disconnection during speech communication is not limited to an outgoing call. Redial processing can be performed for both an outgoing call and an incoming call.

Calling information is registered as a calling record in calling processing, and call reception information is registered as a call reception record in call reception processing. For this reason, even when a sudden channel disconnection occurs during communication, reconnection can be performed. That is, redial processing can be immediately executed to restore the communication state.

Furthermore, since all cumbersome operations such as the registration operation during communication, the read operation, and the off-hook and on-hook operations can be omitted, the operability is improved.

What is claimed is:

1. A redialing apparatus for a portable telephone, comprising:

channel disconnection detection means for monitoring a communication state during communication to detect a channel disconnection;

on-hook processing means for, when said channel disconnection detection means detects a channel disconnection, executing on-hook processing;

call determination means for, when said channel disconnection detection means detects the channel disconnection, determining whether a call during communication is an outgoing call or an incoming call;

redial processing means for, when said call determination means determines that the call is an outgoing call, executing redial processing on the basis of calling information used for calling processing of the call during communication, and when said call determination means determines that the call is an incoming call, executing redial processing on the basis of call reception information used for call reception processing of the call during communications;

calling/call reception information memory having a calling information registration area where a set of calling party information and called party information is registered in calling processing of the call during communication and a call reception information registration area where a set of calling parry information and called party information is registered in call reception processing of the call during communication, and when said call determination means determines that the call is an outdoing call, said redial processing means executes redial processing on the basis of the called party information read out from the calling information registration area of said calling/call reception information memory, and when said call determination means determines that the call is an incoming call, said redial processing means executes redial processing on the basis of the calling party information read out from the call reception information registration area of said calling/call reception information memory; and calling party information detection means for, when said call determination means determines that the call is an incoming call, searching the call reception information registration area of said calling/call reception information memory to detect the presence/absence of registration of the calling party information, and when said calling party information detection means detects the presence of registration of calling party information, said redial processing means executes redial processing on the basis of the detected calling party information, and when said calling party information detection means detects the absence of registration of calling party information, said redial processing means executes operator calling processing of requesting an operator at a base station to redial a calling party of the incoming call before the channel disconnection.

2. An apparatus according to claim 1, further comprising control means for registering a calling record containing the set of calling party information and called party information in said calling/call reception information memory by a calling operation and registering a call reception record containing the set of calling party information and called party information in said calling/call reception information memory upon receiving a ringing signal.

3. An apparatus according to claim 1, wherein said apparatus further comprises setting memory in which redialing is set, and control means for, when said channel disconnection detection means detects a channel disconnection, detecting the presence/absence of redial setting with reference to said setting memory, and said call determination means performs a call determination operation when said control means detects the presence of redial setting.

4. An apparatus according to claim 1, wherein said channel disconnection detection means detects one of a radio channel disconnection, a reception failure, a radio wave break, a resynchronization failure, and degradation in quality and outputs a channel disconnection detection signal.

5. A portable telephone which performs redial processing for reconnection when a channel disconnection occurs during communication, comprising:

redial processing means for executing redial processing on the basis of calling information used in calling processing when a call before the channel disconnection is an outgoing call and executes redial processing on the basis of call reception information used in call reception processing when the call before the channel disconnection is an incoming call;

calling/call reception information memory having a calling information registration area where a set of calling party information and called party information is registered in calling processing of the call during communication and a call reception information registration area where a set of calling party information and called party information is registered in call reception processing of the call during communication, and when said call is an outgoing call, said redial processing means executes redial processing on the basis of the called party information read out from the calling information registration area of said calling/call reception information memory, and when said call is an incoming call, said redial processing means executes redial processing on the basis of the calling party information read out from the call reception information registration area of said calling/call reception information memory; and calling party information detection means for, when said call is an incoming call, searching the call reception information registration area of said calling/call reception information memory to detect the presence/absence of registration of the calling party information, and when said calling party information detection means detects the presence of registration of calling party information, said redial processing means executes redial processing on the basis of the detected calling party information, and when said calling party information detection means detects the absence of registration of calling party information, said redial processing means executes operator calling processing of reguesting an operator at a base station to redial a calling party of the incoming call before the channel disconnection.

* * * * *